M. DALYAI.
DIRIGIBLE TURNING HEADLIGHT FOR AUTOMOBILES.
APPLICATION FILED APR. 20, 1922.
1,438,520.                                    Patented Dec. 12, 1922.
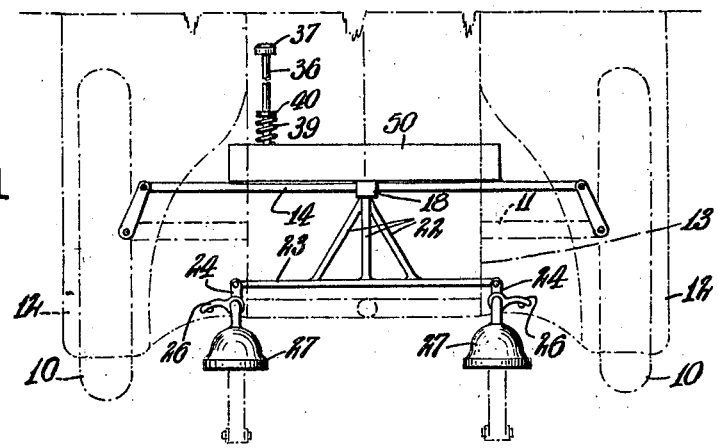
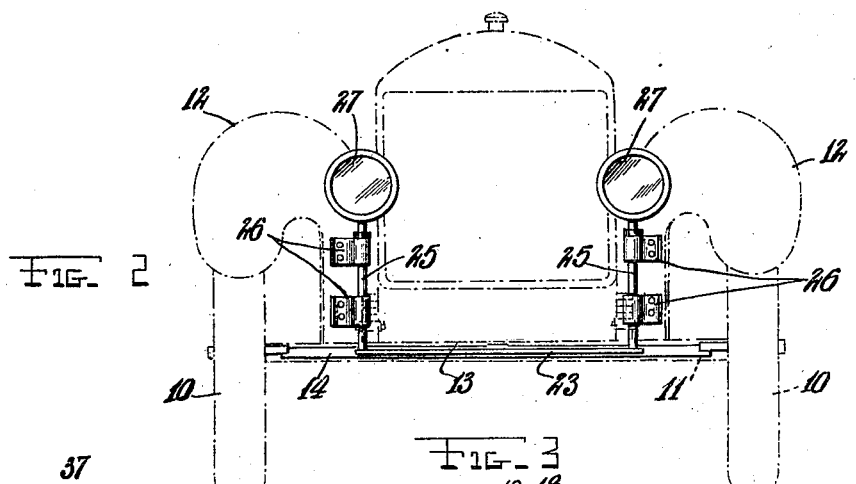
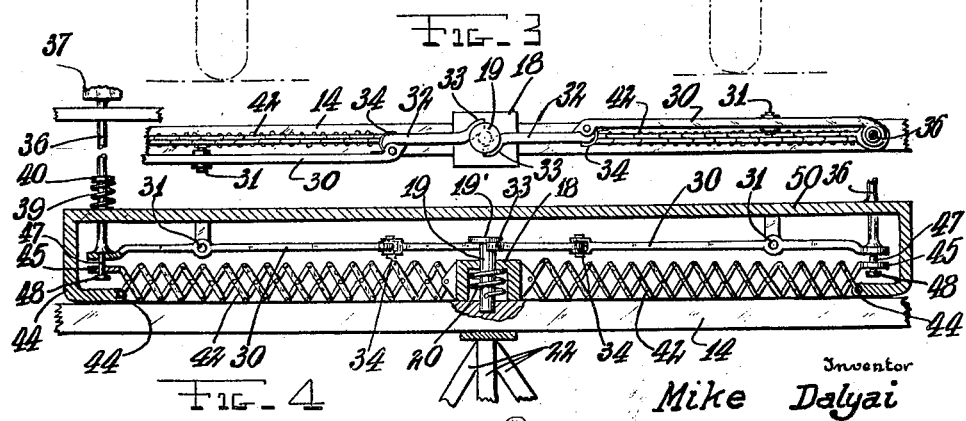
Inventor
Mike Dalyai Patented Dec. 12, 1922.

1,438,520

UNITED STATES PATENT OFFICE.

MIKE DALYAI, OF CARETTA, WEST VIRGINIA.

DIRIGIBLE TURNING HEADLIGHT FOR AUTOMOBILES.

Application filed April 20, 1922. Serial No. 555,732.

*To all whom it may concern:*

Be it known that I, MIKE DALYAI, a citizen of Hungary, residing at Caretta, in the county of McDowell and State of West Virginia, have invented certain new and useful Improvements in Dirigible Turning Headlights for Automobiles, of which the following is a specification.

This invention relates to dirigible headlights for automobiles, having for a general object to provide a simple form of automobile headlight adapted to turn to right or left as the steering wheels are correspondingly turned.

A further object of the invention is to enable the headlights to be swung independently of the movement of the steering wheels when desired.

For further comprehension of the invention, and of the objects and advantages thereof, reference will be had to the following description and accompanying drawings, and to the appended claims in which the various novel features of the invention are more particularly set forth.

Fig. 1 of the drawings is a plan view illustrating the application of my improved dirigible headlights to an automobile.

Fig. 2 is a front view.

Fig. 3 is an enlarged fragmentary rear view of the control means adapted to operate independently of the wheels.

Fig. 4 is a detail plan view thereof, with parts in horizontal section.

In the drawings I have indicated the front wheels of an automobile at 10, the front axle at 11, the fenders at 12 and part of the body at 13, these parts being of ordinary construction. The usual transverse steering bar, which connects to the wheels at opposite ends is shown at 14.

According to my invention I slidably mount on the bar 14 a hollow head 18 through the rear side of which extends a pin 19 normally engaging in a suitable socket in the bar 14 midway between the ends of the latter, being urged into the socket by an expansion spring 20 coiled therearound in a recess in the head 18 and connected at its forward end thereto. Extending forwardly from this head 18 is a compound arm 22 which is fixed at its forward end to a transverse rod 23, this rod being connected at opposite ends to a pair of arms 24 fixed to, and projecting rearwardly from, a pair of posts 25 rotatively supported in brackets 26 fixed to the body 13 and having ordinary headlights 27 mounted on their upper ends. As will be apparent, the headlights will swing in corresponding directions to the wheels as the latter are turned by rotating the usual steering wheel.

To enable the headlights to be swung independently of the wheels 10 when desired I provide the following mechanism. Extending transversely of the automobile behind the bar 14 are a pair of arms 30 which are fulcrumed between their ends as at 31 to the automobile body to swing in a common horizontal plane. The adjacent ends of these arms are in the form of short hinged sections 32 having obliquely offset ends 33 which project on opposite sides of the pin 19 in front of a head 19' on the projecting rear end of the latter, being held yieldingly in extended position by springs 34. At their opposed ends the arms 30 are engaged by push-bars 36 which extend rearwardly to a suitable point and have pedal heads such as 37 on their rear ends. These push-bars 36 are normally urged in a rearward direction by means of expansion springs such as 39 coiled therearound and bearing at one end against a suitable fixed part and at their opposite ends against flanges such as 40 on the push-bars.

When either of the push-bars is pushed forward the pin 19 is first lifted from engagement with the steering bar 14, means being provided as follows whereby a further movement of the push-bar will move the head 18 transversely of the automobile to swing the headlights independently of the steering mechanism. Connected to opposite sides of the head 18 are a pair of transversely extending lazy-tong elements 42 which at their opposed ends each have one link connected as at 43 to a bracket 44 fixed on the body 13 and have their other end link extended its free end in the form of a flat finger 45 which extends in close adjacence to the outer end of lever 30. Upon the forward ends of the push-bars 36 are diminished extensions 47 which pass freely through suitable slots in the lever and lazy-tong ends and have heads 48 fixed on their forward ends. As will be apparent, the continued forward movement of either push-bar 36, after the pin 19 has been freed from the bar 14, will cause the lazy-tong device connected thereto to expand and so move the head 18 transversely of the automobile. In order to protect the headlight adjusting devices they may be enclosed in a channeled casing 50 fixed to the automobile body.

It is believed that the manner of use and operation of my invention will be apparent from the above description. Normally the pin 19 engages with the bar 14 and the head 18 moves with the latter, the hinged sections 32 yielding as the pin 18 moves with the bar 14. When either push-bar is depressed the lever 30 engaged thereby is first operated to pull pin 19 backward and then the corresponding lazy-tongs 42 are moved to shift the head 18.

While I have illustrated and described a preferred embodiment of my invention it will be understood that various changes and modifications might be made therein without departing from the spirit and scope of the invention.

Having thus described my invention what I claim as new and desire to protect by Letters Patent of the United States is as follows:

1. In an automobile, a pair of swingable headlights, steering mechanism including a transversely movable bar, a head fitting slidably on said bar, means whereby movement of said head swings said headlights, and releasable means holding said head against sliding movement on said bar, and means for moving said head transversely of the automobile independently of said bar, said last means including a pair of lazy-tong devices engaging said head on opposite sides thereof.

2. In an automobile, a pair of swingable headlights, steering mechanism including a transversely movable bar, a head slidable on said bar, means operatively connecting said head to said headlights to swing the latter upon movement of said head transversely of the automobile, a headed locking-pin slidable in said head and yieldingly urged into a socket in said bar, a pair of transversely extending levers fulcrumed between their ends and each engaging under the head of the said pin at one end, push-bars engaged with the opposite ends of the levers, and means adapted to be operated by said push-bars after an initial movement thereof to move said head transversely of the automobile.

3. In an automobile, a pair of swingable headlights, steering mechanism including a transversely movable bar, a head slidable on said bar, means operatively connecting said head to said headlights to swing the latter upon movement of said head transversely of the automobile, a headed locking-pin slidable in said head and yieldingly urged into a socket in said bar, a pair of transversely extending levers fulcrumed between their ends and each engaging under the head of the said pin at one end, push-bars engaged with the opposite ends of the levers, and means adapted to be operated by said push-bars after an initial movement thereof to move said head transversely of the automobile, said means comprising lazy-tong elements connected to said head.

4. In an automobile, a pair of swingable headlights, steering mechanism including a transversely movable bar, a head fitting slidably on said bar, means whereby movement of said head swings said headlights, and releasable means holding said head against sliding movement on said bar, and means for moving said head transversely of the automobile independently of said bar, said last means including a pair of lazy-tong devices engaging said head on opposite sides thereof, and a common manually operable element for releasing said head holding means and operating said lazy-tong devices.

In testimony whereof I have affixed my signature.

MIKE DALYAI.